(12) United States Patent
Miyakoshi

(10) Patent No.: US 7,210,155 B2
(45) Date of Patent: Apr. 24, 2007

(54) MAGNETO-OPTICAL RECORDING MEDIUM HAVING IN-PLANE MAGNETIZING LAYER

(75) Inventor: Toshimori Miyakoshi, Kanagawa (JP)

(73) Assignee: Canon Kabushiki Kaisha, Shimomaruko, Ohta-ku, Tokyo (JP)

( * ) Notice: Subject to any disclaimer, the term of this patent is extended or adjusted under 35 U.S.C. 154(b) by 417 days.

(21) Appl. No.: 10/886,673

(22) Filed: Jul. 9, 2004

(65) Prior Publication Data
US 2005/0028183 A1 Feb. 3, 2005

(30) Foreign Application Priority Data
Jul. 30, 2003 (JP) ............... 2003-203497

(51) Int. Cl.
*G11B 23/03* (2006.01)
*G11B 7/24* (2006.01)
*G11B 11/00* (2006.01)

(52) U.S. Cl. .................... 720/718; 369/13.39
(58) Field of Classification Search ............. 720/718; 369/13.39
See application file for complete search history.

(56) References Cited

U.S. PATENT DOCUMENTS

| | | | | |
|---|---|---|---|---|
| 5,164,925 A | * | 11/1992 | Sato et al. | 369/13.14 |
| 5,168,482 A | | 12/1992 | Aratani et al. | 369/13 |
| 5,283,770 A | * | 2/1994 | Nakao et al. | 369/13.07 |
| 5,616,428 A | | 4/1997 | Nishimura et al. | 428/694 ML |
| 5,705,286 A | * | 1/1998 | Hirokane et al. | 428/819 |
| 5,772,856 A | * | 6/1998 | Kawase et al. | 204/192.2 |
| 5,831,944 A | | 11/1998 | Nishimura | 369/13 |
| 5,889,739 A | * | 3/1999 | Nishimura et al. | 369/13.07 |
| 5,965,285 A | * | 10/1999 | Mihara et al. | 428/820.1 |
| 5,976,688 A | * | 11/1999 | Kawase et al. | 428/332 |
| 5,982,713 A | * | 11/1999 | Nakayama et al. | 428/820 |
| 5,985,436 A | * | 11/1999 | Hirokane et al. | 428/332 |
| 5,993,616 A | * | 11/1999 | Suwabe et al. | 204/192.15 |
| 6,027,825 A | | 2/2000 | Shiratori et al. | 428/694 ML |
| 6,086,993 A | * | 7/2000 | Yoshinari et al. | 428/336 |

(Continued)

FOREIGN PATENT DOCUMENTS

JP 01149245 A * 6/1989

(Continued)

OTHER PUBLICATIONS

Tsutomu Shiratori et al., "High-Density Magneto-Optical Recording with Domain Wall Displacement Detection", *J. Magn. Soc. Jpn.*, vol. 22, Supplement No. S2 (1998), pp. 47-50.

*Primary Examiner*—Angel Castro
*Assistant Examiner*—Christopher R. Magee
(74) *Attorney, Agent, or Firm*—Fitzpatrick, Cella, Harper & Scinto

(57) ABSTRACT

A high-density magneto-optical recording medium having excellent jitter properties is provided. A pattern-dependent shift of the length of a recorded mark does not occur even when a minute mark has increased sensitivity to a recording magnetic field. A magneto-optical recording medium has at least a displacement layer, a memory layer, and an auxiliary memory layer. A mark with a length up to the diffraction-limit of the optical system is recorded and read out. The magneto-optical recording medium includes an in-plane magnetization-inducing layer principally made of cobalt on the auxiliary memory layer.

6 Claims, 8 Drawing Sheets

U.S. PATENT DOCUMENTS

| | | | | |
|---|---|---|---|---|
| 6,147,939 A | * | 11/2000 | Takahashi et al. | 369/13.43 |
| 6,272,077 B1 | * | 8/2001 | Takahashi et al. | 369/13.43 |
| 6,399,174 B1 | | 6/2002 | Shiratori et al. | 428/64.3 |
| 6,403,148 B1 | | 6/2002 | Shiratori et al. | 427/128 |
| 6,407,979 B1 | | 6/2002 | Matsumoto et al. | 369/275.4 |
| 6,424,601 B1 | * | 7/2002 | Oonuki et al. | 369/13.08 |
| 6,430,115 B1 | * | 8/2002 | Hirokane et al. | 369/13.43 |
| 6,436,524 B1 | * | 8/2002 | Ishida et al. | 428/332 |
| 6,463,016 B1 | * | 10/2002 | Hirokane et al. | 369/13.4 |
| 6,532,196 B2 | * | 3/2003 | Tanase et al. | 369/13.43 |
| 6,693,854 B2 | * | 2/2004 | Shimazaki et al. | 369/13.05 |
| 2002/0141328 A1 | | 10/2002 | Matsumoto et al. | 369/275.4 |
| 2003/0175554 A1 | | 9/2003 | Miyakoshi | 428/693 |
| 2003/0179691 A1 | | 9/2003 | Matsumoto et al. | 369/275.4 |

FOREIGN PATENT DOCUMENTS

| | | |
|---|---|---|
| JP | 3-93058 | 4/1991 |
| JP | 6-124500 | 5/1994 |
| JP | 6-290496 | 10/1994 |
| JP | 9-161321 | 6/1997 |

* cited by examiner

MAGNETO-OPTICAL RECORDING MEDIUM HAVING IN-PLANE MAGNETIZING LAYER

BACKGROUND OF THE INVENTION

1. Field of the Invention

The present invention relates to a magneto-optical recording medium having a high areal recording density. In particular, it relates to a magneto-optical recording medium having a high sensitivity to a recording magnetic field.

2. Description of the Related Art

A variety of magnetic recording media have been in practical use as rewritable recording media. In particular, magneto-optical recording media have been deemed promising as mass-storage media capable of high-density recording. There is a known magneto-optical recording medium in which information is recorded by writing magnetic domains in a magnetic thin film by thermal energy of a semiconductor laser and information is read out by the magneto-optical effect. In recent years, along with the trend of digitization of moving images, there have been demands for a larger-capacity recording medium having increased recording density.

Generally, the linear recording density of an optical recording medium strongly depends on the laser wavelength used in a readout optical system and on the numerical aperture (NA) of an objective lens. More specifically, once the laser wavelength $\lambda$ used in the readout optical system and the numerical aperture (NA) of the objective lens are determined, the diameter of the laser beam is also determined. Thus, the detection limit of the spatial frequency capable of reading signals from recorded pits is about $2NA/\lambda$. Therefore, to achieve high-density recording in optical disks, in general, it is necessary to decrease the laser wavelength used in the readout optical system and to increase the numerical aperture NA of the objective lens. However, it is difficult to decrease the laser wavelength due to heat generation and inefficiency of the light-emitting element. Moreover, increasing the numerical aperture of the objective lens results in a shallow depth of focus, thus requiring higher mechanical accuracy. Hence, super-resolution techniques have been developed in various forms to improve the recording density by devising a structure and a readout method that do not change the laser wavelength and the numerical aperture of the objective lens.

For example, Japanese Patent Laid-Open Nos. 3-93058 and 6-124500 disclose a method for reading a signal. A signal is recorded in a memory layer, which is magnetically coupled to a readout layer, the memory layer adjoining or contacting the readout layer. Simultaneously, the magnetization of the readout layer is oriented. In the case of Japanese Patent Laid-Open No. 6-124500, the magnetization is oriented in-plane. Then, a laser beam is directed on the readout layer, causing heat generation. A recorded signal in the memory layer is transferred to the heated area of the readout layer and the transferred signal is read out. In this method, the size of the area (aperture) heated by the laser beam to reach a transfer temperature (the area having a signal to be detected) can be smaller than the spot diameter of a readout laser beam. Therefore, intersymbol interference is reduced during readout and a signal having a pit period with an optical detection limit of $\lambda/2NA$ can be read out. Such a readout method is referred to as a magnetically-induced super resolution readout method (MSR).

In MSR, however, the signal detection area is small relative to the spot diameter of the readout laser beam, thus causing a significant decrease in the amplitude of the readout signal. Accordingly, the readout output is generally insufficient. Therefore, the signal detection area cannot be much smaller than the spot diameter. As a result, it is not possible to accomplish a significantly high recording density relative to the recording density determined by the diffraction limit of the optical system.

Japanese Patent Laid-Open No. 6-290496 discloses a magneto-optical recording medium and a readout method. A magnetic domain wall (hereinafter, referred to as "domain wall") at the boundary of a recorded mark shifts to higher temperatures by applying a temperature gradient. A signal recorded at a high density exceeding the readout resolution limit of the optical system can be read without a decrease in the amplitude of the readout signal by detecting the displacement of the domain wall. Such a readout method is referred to as a domain wall displacement detection (DWDD) readout method.

As shown in FIG. 7A, in the DWDD readout method, a first magnetic layer 701 having a small domain-wall coercive force, a second magnetic layer 702 having a low Curie temperature, and a third magnetic layer 703 having a large domain-wall coercive force, are stacked. As described in J. Magn. Soc. Jpn., 22, suppl. No. S2, pp. 47–50 (1998), the first magnetic layer 701 functions as a displacement layer (readout layer) where a domain wall moves during readout, the second magnetic layer 702 functions as a switching layer for controlling a starting position of the domain wall displacement, and the third magnetic layer 703 functions as a memory layer for retaining information. Forming a temperature distribution on the second magnetic layer 702 by laser beam irradiation (see FIG. 7B) leads to a distribution of the domain wall energy density (see FIG. 7C). Since higher-temperature regions have low domain wall energy densities, a driving force for moving a domain-wall to the higher-temperature region is generated.

However, these magnetic layers are magnetically coupled to each other by an exchange coupling force at temperatures below the Curie temperature of the switching layer; hence, a domain wall cannot move by the domain-wall coercive force of the memory layer, even when the driving force is applied. Since the exchange coupling force decreases at a position having a temperature (Ts) near the Curie temperature of the switching layer, only a domain wall in the displacement layer, having a small domain-wall coercive force, can move to a higher-temperature region. When the recording medium moves in a region having a temperature distribution, such a domain wall movement occurs at time intervals corresponding to the spacing between adjacent domain walls. Therefore, a signal recorded at a high density exceeding the readout resolution limit of the optical system can be read by detecting the domain wall movement.

A problem with the medium used for the DWDD readout method described above is that decreasing the length of a recorded mark impairs sensitivity to a recording magnetic field. This is because magnetic layers having as low a saturation magnetization as possible are used in order to reduce the effect of a stray field on the domain wall displacement during readout. In addition, the memory layer is composed of a magnetic material having a high magnetic anisotropy in order to reliably store a shorter recorded mark; hence, large energy is required for reversing the direction of magnetization.

In magnetic field modulation recording, which is suitable for higher-density recording, a magnetic head can generate a magnetic field ranging in intensity from about 200 to about 300 Oe at best. In view of lower power consumption and higher-speed, the magnetic field generated by the magnetic head preferably has an intensity of 200 Oe or less.

To solve the problem described above, the following technique has been widely employed: a magnetic layer having weak magnetic anisotropy relative to that of the memory layer is provided adjacent to the memory layer, thus resulting in a high sensitivity to a recording magnetic field.

The magnetic layer having a low magnetic anisotropy (hereinafter, referred to as "auxiliary memory layer") is provided to aid in recording at temperatures required for recording, i.e., high temperatures. An increase in the saturation magnetization of the auxiliary memory layer inevitably increases the saturation magnetization of the same layer at low temperatures. As a result, the intensities of a demagnetizing field and a stray field also increase, thereby affecting recording. That is, a variation in the length of a recorded mark caused by the effect of the demagnetizing field and the stray field leads to a pattern-dependent shift of a domain wall, thus impairing the jitter properties in reading a random signal. In land/groove recording, this problem becomes more serious.

In a medium used for the DWDD readout method, adjacent domain walls need to be isolated from each other in order that the domain wall in the displacement layer can readily move during reading. To achieve the isolation of the adjacent domain walls, after forming the memory layer, the switching layer, and displacement layer, these layers, which are disposed on a guide groove between recording tracks, are subjected to annealing treatment with a high-power laser beam. That is, the exchange coupling force between the magnetic layers on the guide groove decreases or is removed by the annealing treatment. The domain wall isolation is accomplished by extending the recording mark to the guide groove.

However, when the land/groove recording and narrower track pitch are applied to achieve higher-density recording, the annealing treatment for a guide groove between recording tracks is quite difficult, thus causing problems in reliability.

For the land/groove recording, Japanese Patent Laid-Open No. 9-161321 discloses the following: an increase in groove depth can delimit the magnetic layers up to a certain point, thereby eliminating the need for the annealing treatment.

However, as shown in FIG. 8, in this method disclosed in Japanese Patent Laid-Open No. 9-161321, a film 801 deposited on a groove 802 has a thickness lower than that of a film deposited on a land 803; hence, another problem arises in that the two films deposited on the groove and the land have different properties, especially, in sensitivities to the recording magnetic field.

Consequently, in such a medium for the DWDD readout method, there are conflicting requirements in terms of sensitivity to the recording magnetic field of a minute mark and the jitter properties of a random signal; therefore, it is difficult to balance them.

SUMMARY OF THE INVENTION

It is an object of the present invention to provide a magneto-optical recording medium suitable for a DWDD readout method, the magneto-optical recording medium having a high sensitivity to a magnetic field and excellent jitter properties in reading out a random signal.

To attain the above object, a magneto-optical recording medium includes a memory layer for recording information; an auxiliary memory layer magnetically coupled to the memory layer and having weaker perpendicular magnetic anisotropy than that of the memory layer, the auxiliary memory layer including a first auxiliary memory sublayer and a second auxiliary memory sublayer having different Curie temperatures; and an in-plane magnetization-inducing layer principally made of cobalt, the in-plane magnetization-inducing layer causing in-plane magnetization orientation of the auxiliary memory layer by a magnetic exchange interaction.

Further objects, features, and advantages of the present invention will become apparent from the following description of the preferred embodiments with reference to the attached drawings.

DESCRIPTION OF THE PREFERRED EMBODIMENTS

An embodiment according to the present invention will now be described below with reference to the drawings.

Figure 1:
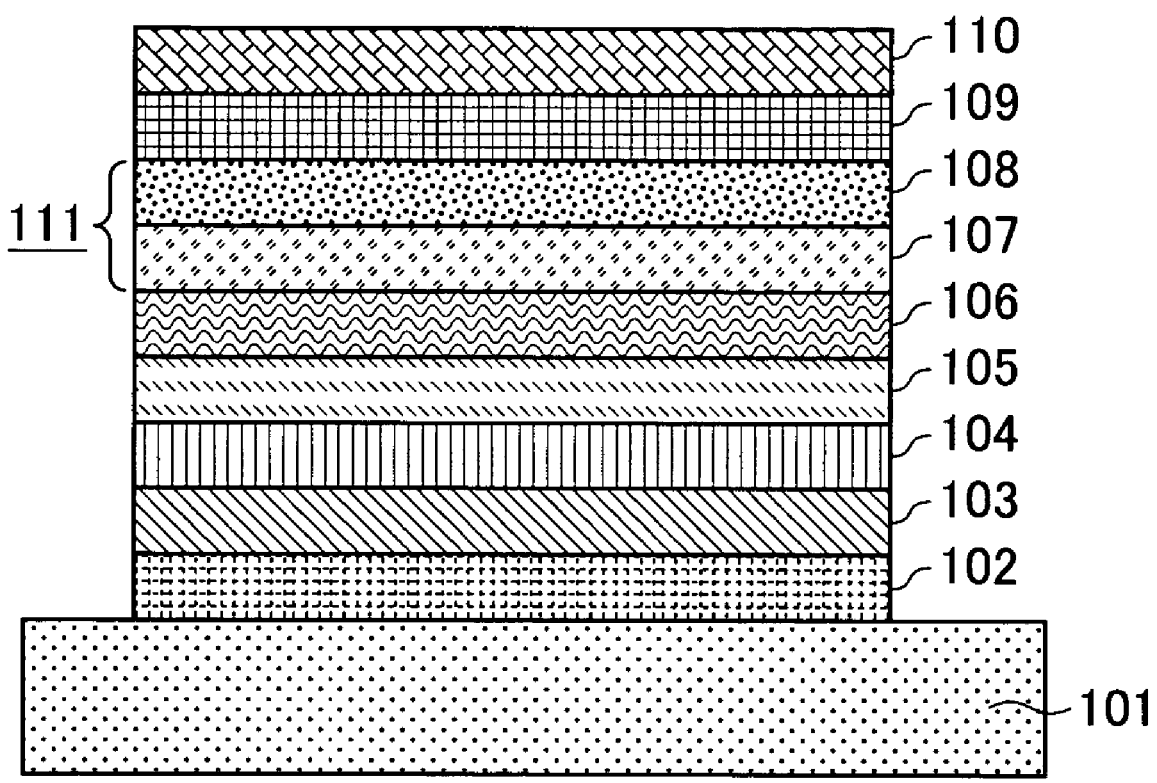
FIG. 1 is a schematic cross-sectional view of a magneto-optical recording medium according to an embodiment of the present invention.

As shown in FIG. 1, a magneto-optical recording medium according to an embodiment of the present invention includes a first dielectric layer 102, a displacement layer 103, a control layer 104, a switching layer 105, a memory layer 106, an auxiliary memory layer 111 including a first auxiliary memory sublayer 107 and a second auxiliary memory sublayer 108, an in-plane magnetization-inducing layer 109, and a second dielectric layer 110, formed in that order, on a substrate 101.

The substrate 101 may be made of, for example, polycarbonate, amorphous polyolefin, an acrylic resin, or glass. The first dielectric layer 102 and the second dielectric layer 110 may be made of, for example, SiN, AlN, SiO, ZnS, MgF, or TaO. If a domain wall displacement is detected by a method other than optical detection, a translucent material is not necessary for the substrate 101.

Figure 7A:
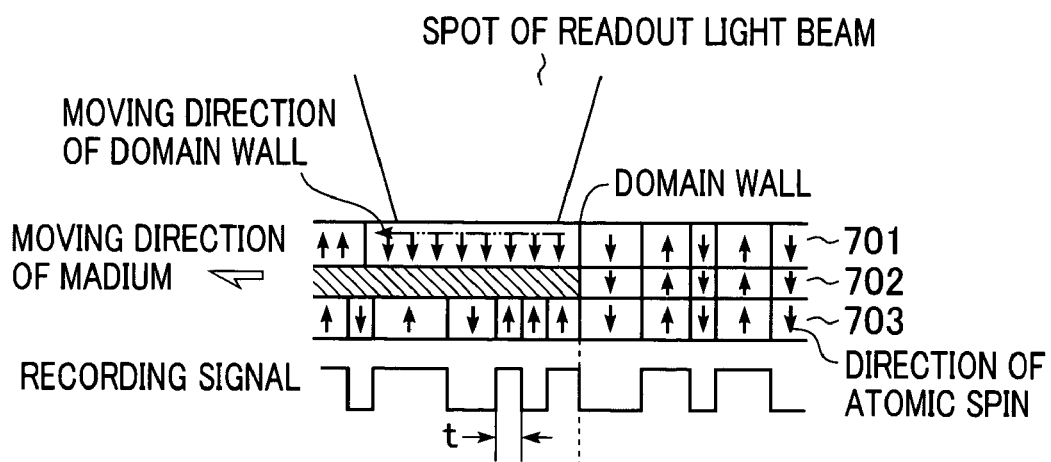
FIG. 7 is a schematic view illustrating a prior art DWDD readout method.
Figure 7B:
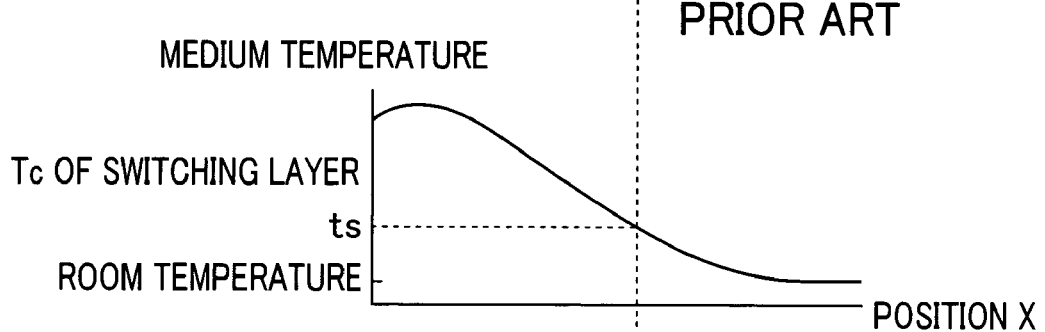
Figure 7C:
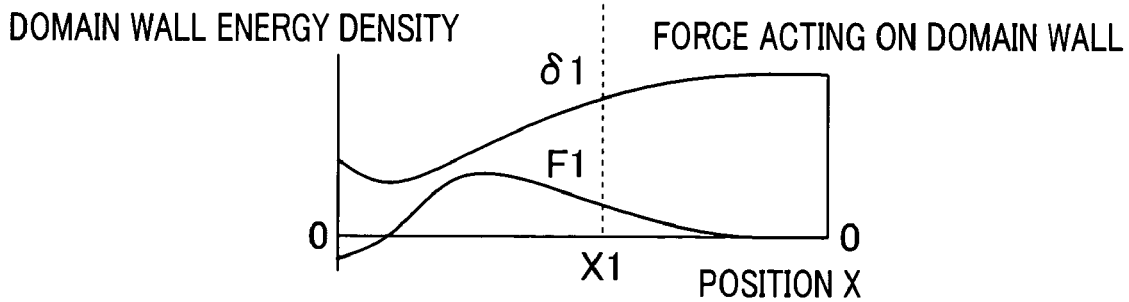
Figure 8:
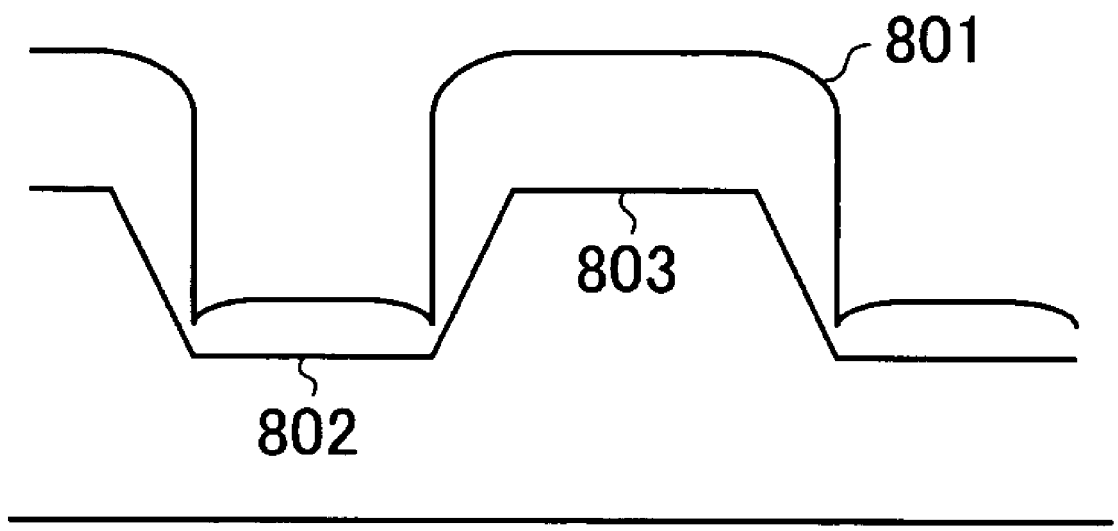
FIG. 8 is a schematic cross-sectional view illustrating the conventional form of a film deposited on a land/groove substrate having a deep groove.

The displacement layer 103, the switching layer 105, and the memory layer 106 are also employed for the DWDD readout method. In the displacement layer 103, by moving a domain wall of a recorded magnetic domain transferred from the memory layer 106, the transferred magnetic domain is enlarged to read a recorded signal. The displacement layer 103 has a small domain-wall coercive force compared with that of the memory layer 106. In view of the improvement of the readout properties, the displacement layer 103 may have a composition gradient in the direction of its thickness and may be composed of multiple sublayers. The control layer 104 suppresses undesired domain wall displacement (ghost signal) at the left edge (see FIG. 7A) of the spot of a readout laser. The control layer 104 may be a magnetic layer made of a TbFeCo-based alloy or a TbDyFeCo-based alloy. This control layer 104 is optional. The memory layer 106 for recording information is made of a material having relatively strong perpendicular magnetic anisotropy. The memory layer 106 may be composed of an amorphous alloy made of at least one rare-earth element and at least one transition metal. For example, Tb and Dy may be used as the rare-earth element, and a TbDy alloy may also be used. For example, a TbFeCo alloy may be used as the amorphous alloy. A first auxiliary memory sublayer 107 enhances the sensitivity to a modulated magnetic field during recording. The first auxiliary memory sublayer 107 may be made of a material having weak perpendicular magnetic anisotropy compared with that of the memory layer 106. The first auxiliary memory sublayer 107 may be a magnetic layer made of, for example, a GdFeCo-based alloy or a GdDyFeCo-based alloy. The in-plane magnetization-inducing layer 109 causes in-plane magnetization orientation of the first auxiliary memory sublayer 107 by a magnetic exchange interaction. The in-plane magnetization-inducing layer 109 may be a magnetic layer principally made of Co. The term "principally" as employed herein relative to layer compositions means that the element to which the term pertains is present in amounts of at least about 80% based on the total layer composition. The second auxiliary memory sublayer 108 adjusts a magnetic exchange interaction between the first auxiliary memory sublayer 107 and the in-plane magnetization-inducing layer 109. The second auxiliary memory sublayer 108 may be a magnetic layer made of, for example, a GdFeCo-based alloy or a GdDyFeCo-based alloy. The second auxiliary memory sublayer 108 has a lower Curie temperature compared with those of the first auxiliary memory sublayer 107 and the memory layer 106.

The structure shown in FIG. 1 may further include a metal layer made of, for example, Al, AlTa, AlTi, AlCr, AlSi, Cu, Pt, or Au. The metal layer can adjust the thermal properties of the structure. Furthermore, a protective layer made of a polymeric resin may be formed. Two substrates including all layers may be bonded together. Any layer that is not made of magnetic material is optional. The magnetic layers may be stacked in inverse order. In addition, the stacked layers need not have clear interfaces between adjacent magnetic layers. A region composed of the magnetic layers may be made of a gradient material in which the magnetic properties gradually vary with thickness.

All layers may be successively deposited by vapor deposition or by sputtering with a magnetron sputtering apparatus. In particular, each of the magnetic layers may be successively deposited in order to be coupled to each other by exchange coupling force while a vacuum condition is maintained.

Magnetic layers used as the displacement layer 103 through the second auxiliary memory sublayer 108 shown in FIG. 1 may be made of materials generally used for magnetic recording media and magneto-optical media. In addition, the magnetic layers may also be made of a variety of magnetic materials such as magnetic bubble materials and antiferromagnetic materials. The magnetic layers may be made of amorphous alloys of at least one rare-earth element and at least one iron group metal, each of the amorphous alloys containing from 10 to 40 atomic percent rare-earth element(s) and from 90 to 60 atomic percent iron group metal(s). Examples of the rare-earth elements used for the magnetic layers are, for example, Pr, Nd, Sm, Eu, Gd, Tb, Dy, Ho, and Er. Examples of the iron group metals used for the magnetic layers are, for example, Fe, Co, and Ni. To improve the corrosion resistance of the alloys, each of the alloys may further contain a small amount of an element such as Cr, Mn, Cu, Ti, Al, Si, Pt, or In. Furthermore, the magnetic layers may be made of the following materials: materials composed of platinum group metals and iron group metals, each of the materials having a periodic structure, examples of the material being Pt/Co and Pd/Co; alloys of platinum group metals and iron group metals; antiferromagnetic materials, for example, Co—Ni—O and an FeRh-based alloy; and a magnetic garnet.

For an amorphous alloy of heavy rare-earth elements and iron group metals, saturation magnetization can be controlled by changing the ratio of rare-earth elements to iron group elements in the amorphous alloy. The saturation magnetization of the alloy with a compensated composition at room temperature is 0 emu/cc.

The Curie temperature can also be controlled by changing the composition of the amorphous alloy. To control the Curie temperature independently of the control of the saturation magnetization, iron partially substituted by cobalt is preferably used as the iron group element. Adjusting the content of cobalt in iron controls the Curie temperature of the alloy. By the substitution of one atomic percent of iron for cobalt, the Curie temperature of the alloy rises about 6° C. Therefore, a desired Curie temperature of the alloy can be achieved by adjusting the content of cobalt in iron based on this relationship. Adding a small amount of a non-magnetic element, for example, Cr, Ti, and Al, can decrease the Curie temperature of the alloy. In addition, in an alloy containing at least two rare-earth elements, its Curie temperature can be controlled by adjusting the ratio between the rare-earth elements.

The domain-wall coercive force and the domain-wall energy density can be mainly controlled by selecting material elements. In addition, the domain-wall coercive force and the energy density of the domain wall can also be controlled by adjusting the state of the first dielectric layer 102 provided beneath the displacement layer 103 and the deposition conditions of the magnetic layers, for example, the gas pressure during sputtering. An amorphous alloy containing terbium and dysprosium exhibits strong magnetic anisotropy, a large domain-wall coercive force, and a high domain-wall energy density. An amorphous alloy containing gadolinium exhibits weak magnetic anisotropy, a small domain-wall coercive force, and a low domain-wall energy density. These magnetic properties can also be controlled by adding impurities. The thicknesses of all the layers can be controlled by adjusting the deposition speed and deposition time.

A data signal is recorded into a magneto-optical recording medium of the present invention by thermo-magnetic recording, in other words, by matching magnetization orientation in a domain of the memory layer 106 with the data signal. The magneto-optical recording medium is moved during recording. The memory layer 106 is heated to at least its Curie temperature by laser irradiation. During the cooling step, the sequence of upwardly magnetized domains and downwardly magnetized domains, the sequence corresponding to the modulation of a magnetic field, is transferred from the auxiliary memory layer to the memory layer.

The following examples represent certain preferred embodiments of the invention and are not limitative of scope.

EXAMPLES

Example 1

Targets of B-doped Si, Gd, Tb, Fe, Co, and Cr were mounted in a DC magnetron sputtering apparatus. A land/groove substrate having a track pitch of 0.54 µm and a groove depth of 180 nm was fixed on a substrate holder, and then a chamber was evacuated to a vacuum of $2\times10^{-5}$ Pa with a cryopump. Ar gas was introduced into the chamber while the vacuum condition was maintained in the chamber. The targets were sputtered to form layers while the substrate was rotated. A SiN layer was formed by DC reactive sputtering in $N_2$ gas introduced in addition to argon gas.

That is, Ar gas and $N_2$ gas were introduced into the chamber, and then a desired inner pressure was achieved by adjusting the conductance. A SiN layer having a thickness of 35 nm was formed as the first dielectric layer. The magnetic layers were formed in another chamber because contamination of nitrogen gas causes nitridation of the magnetic layer, which affects the magnetic properties. After the first dielectric layer was formed, the substrate was transported to another chamber. Ar gas was introduced, and then a desired inner pressure was achieved by adjusting the conductance. Three GdFeCoCr layers each having a thickness of 12 nm were stacked to form the displacement layer, each of the GdFeCoCr layers having different ratios of the elements from the others. Subsequently, the flow of the Ar gas was adjusted to achieve a desired inner pressure, and then, a TbFeCoCr layer having a thickness of 14 nm was formed as the control layer, a TbFeCr layer having a thickness of 10 nm was formed as the switching layer, and a TbFeCoCr layer having a thickness of 50 nm was formed as the memory layer.

GdFeCoCr layers with thicknesses of 17 and 5 nm, respectively, were formed as the first and the second auxiliary memory sublayers in an argon atmosphere, each of the GdFeCoCr layers having different ratios of the elements from the other. A CoCr layer with a thickness of 3 nm was formed as the in-plane magnetization-inducing layer in an Ar atmosphere.

Finally, a SiN layer with a thickness of 50 nm was formed as the second dielectric layer by DC reactive sputtering, as with the formation of the first dielectric layer.

The ratio of elements in each of the magnetic layers was determined by controlling the ratio of power applied to the targets of Gd, Tb, Fe, Co, and Cr. Each of the magnetic layers had a composition close to its compensated composition. More specifically, the composition was adjusted such that the magnetization of rare-earth elements was slightly dominant at room temperature and such that the magnetizations of the rare-earth elements and the iron group elements were compensated at a readout temperature near the Curie temperature of the switching layer. The displacement layer included three sublayers, the sublayers having Curie temperatures of 290° C., 240° C., and 210° C., respectively, in that order from the substrate. The control layer had a Curie temperature of about 180° C. The switching layer had a Curie temperature of about 160° C. The memory layer had a Curie temperature of about 330° C. The first auxiliary memory sublayer and the second auxiliary memory sublayer had Curie temperatures of about 380° C. and about 270° C., respectively.

The dynamic characteristics of the sample thus prepared were evaluated by a magnetic disk evaluating apparatus having a regular magnetic head for magnetic field modulation, a laser with a wavelength of 650 nm, and an objective lens with a numerical aperture of 0.60.

Recording was performed by laser-pulsed magnetic field modulation. The memory layer was heated to at least its Curie temperature by laser pulse irradiation. During the cooling step, the applied magnetic field was modulated, and the sequence of upwardly magnetized domains and downwardly magnetized domains, which sequence corresponds to the modulation of the magnetic field, was transferred from the auxiliary memory layer to the memory layer.

An optimal value of the recording power of the laser was selected, ranging from about 5 to about 8 mW under the following conditions: encoding according to run length limited 1,7 scheme (RLL (1,7) scheme); a linear recording density of 0.08 µm/bit; a minimum mark length of 0.107 µm (2T); and a linear velocity of 1.5 m/s. Likewise, an optimal value of the readout power of the laser was selected, ranging from about 1 to about 3 mW. As a result, optimal values of the recording power for a land and a groove were 6.2 mW and 5.8 mW, respectively. Optimal values of the readout power for a land and a groove were 1.7 mW and 1.4 mW, respectively. The dependence of the jitter properties on the strength of the applied magnetic field were measured with a random signal, a tone signal having a mark length of 2T, and a tone signal having a mark length of 8T. The tested medium had a linear recording density of 0.08 µm/bit.

Figure 2:
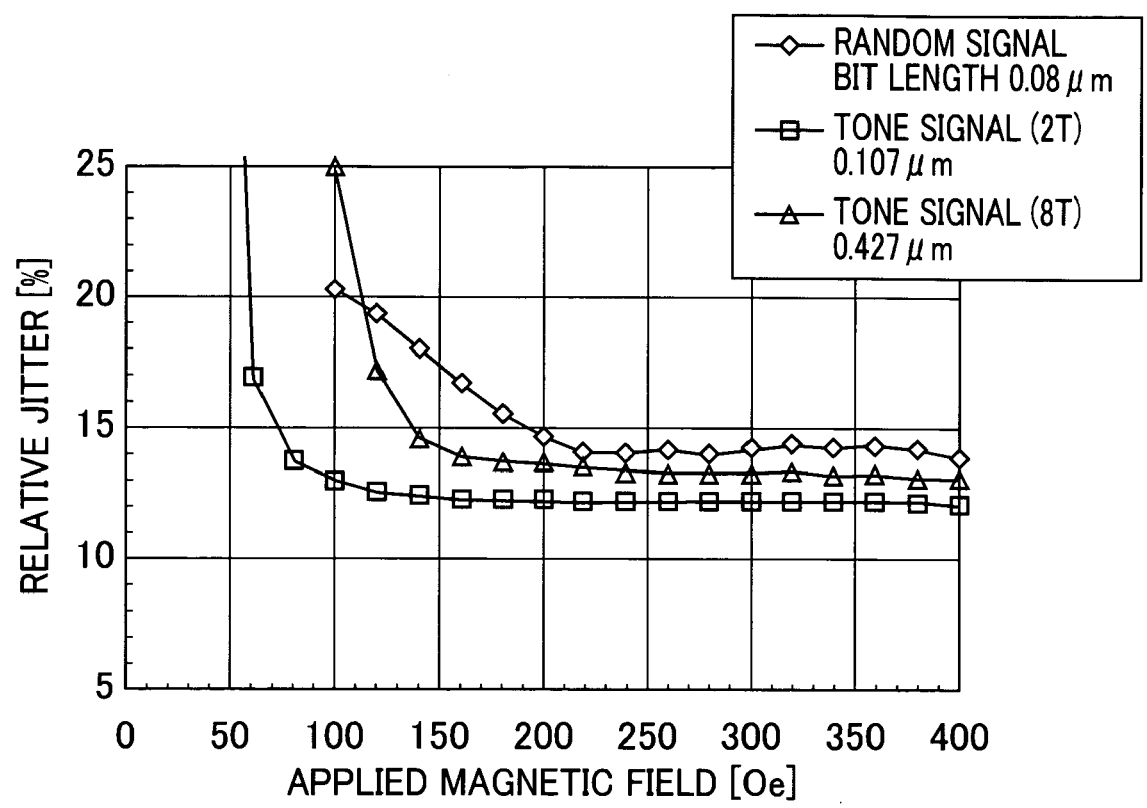
FIG. 2 is a graph showing the relationship between relative jitter and applied magnetic field at a land of a magneto-optical recording medium according to example 1.
Figure 3:
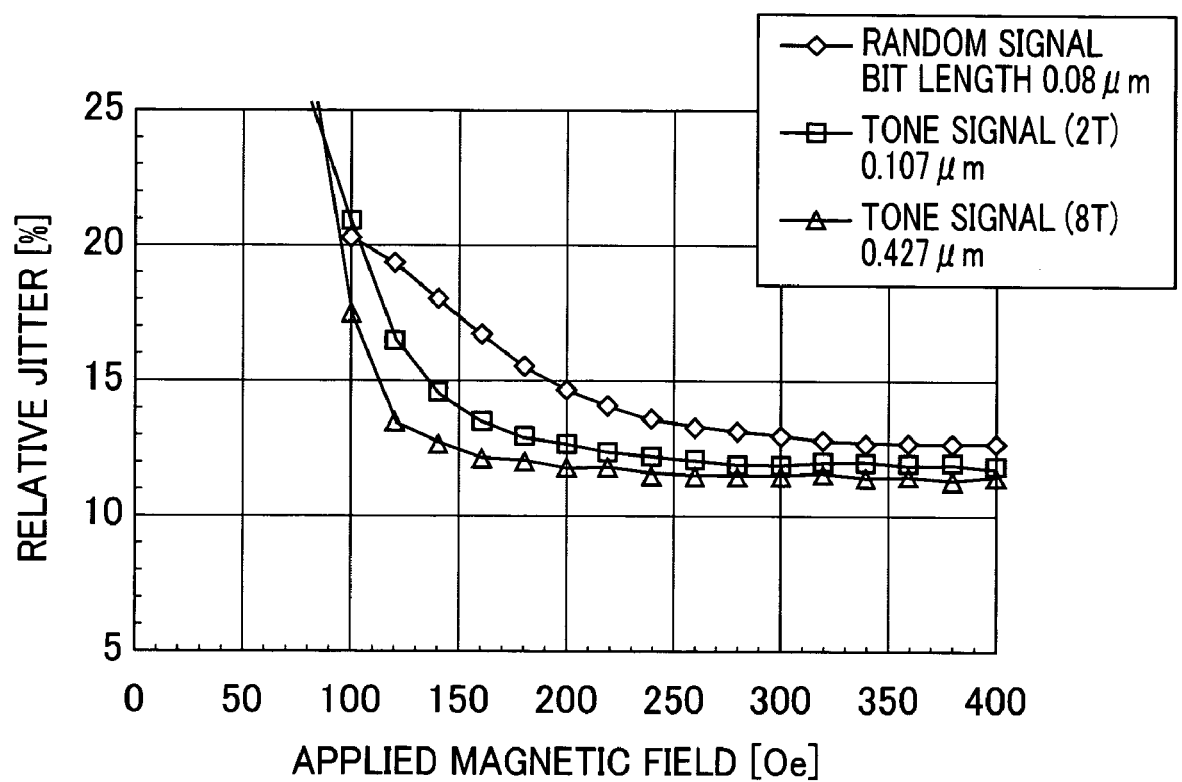
FIG. 3 is a graph showing the relationship between relative jitter and applied magnetic field at a groove of a magneto-optical recording medium according to Example 1.

As shown in FIGS. 2 and 3, excellent jitter properties were observed at the land and the groove. A relative jitter of 15% was achieved at a low magnetic field of about 200 Oe.

Figure 4:
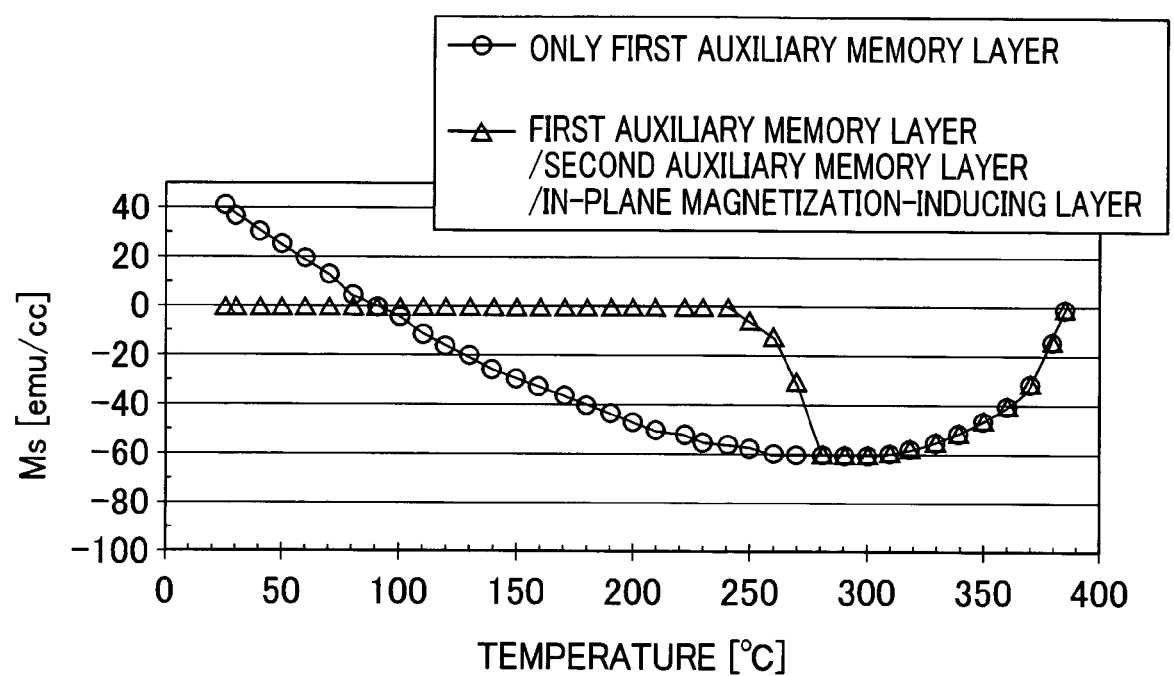
FIG. 4 is a graph showing the temperature dependence of the total magnetization of the auxiliary memory layer and the in-plane magnetization-inducing layer.

Another sample with a glass substrate was prepared for this example. The sample included the first auxiliary memory sublayer, the second auxiliary memory sublayer, and the in-plane magnetization-inducing layer. The dependence of magnetization on temperature in this sample was measured. The film-forming conditions were the same as the above-described sample for evaluating the dynamic characteristics. In addition, Si layers with a thickness of 10 nm were provided beneath first auxiliary memory layer and on the in-plane magnetization-inducing layer. SiN protective layers with a thickness of 30 nm were provided beneath the second dielectric layer and on the memory layer. The dependence of the saturation magnetization (Ms) perpendicular to the film surface on temperature was measured under a magnetic field of 500 Oe by a vibrating sample magnetometer (VSM). In FIG. 4, the positive area indicates that rare-earth sublattice magnetization is dominant, and the negative area indicates that transition metal sublattice magnetization is dominant.

As shown in FIG. 4, since the total magnetization of the first auxiliary memory sublayer, the second auxiliary memory sublayer, and the in-plane magnetization-inducing layer was in-plane oriented from room temperature to 270° C., which was the Curie temperature of the second auxiliary memory sublayer, by the in-plane magnetization-inducing layer, perpendicular magnetization was not observed in this temperature region. This shows that the effects of a stray field and a demagnetizing field were able to be reduced. At higher temperatures above the Curie temperature of the second auxiliary memory sublayer, exchange coupling between the first auxiliary memory sublayer and the in-plane magnetization-inducing layer was broken, thus resulting in perpendicular magnetization orientation of the first auxiliary memory sublayer. This indicates that the first auxiliary memory sublayer contributed to an increase in sensitivity to an external magnetic field in recording. This effect was the original function of the first auxiliary memory sublayer.

Comparative Example 1

Figure 5:
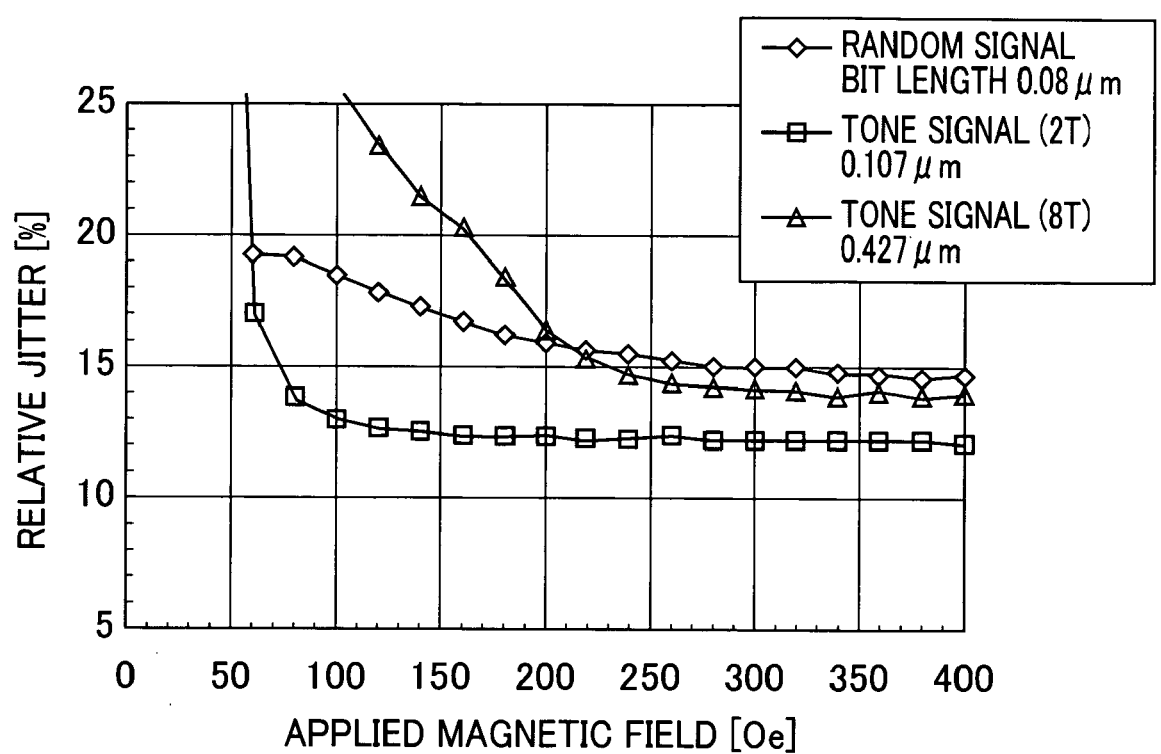
FIG. 5 is a graph showing the relationship between relative jitter and applied magnetic field at a land of a magneto-optical recording medium according to Comparative Example 1.
Figure 6:
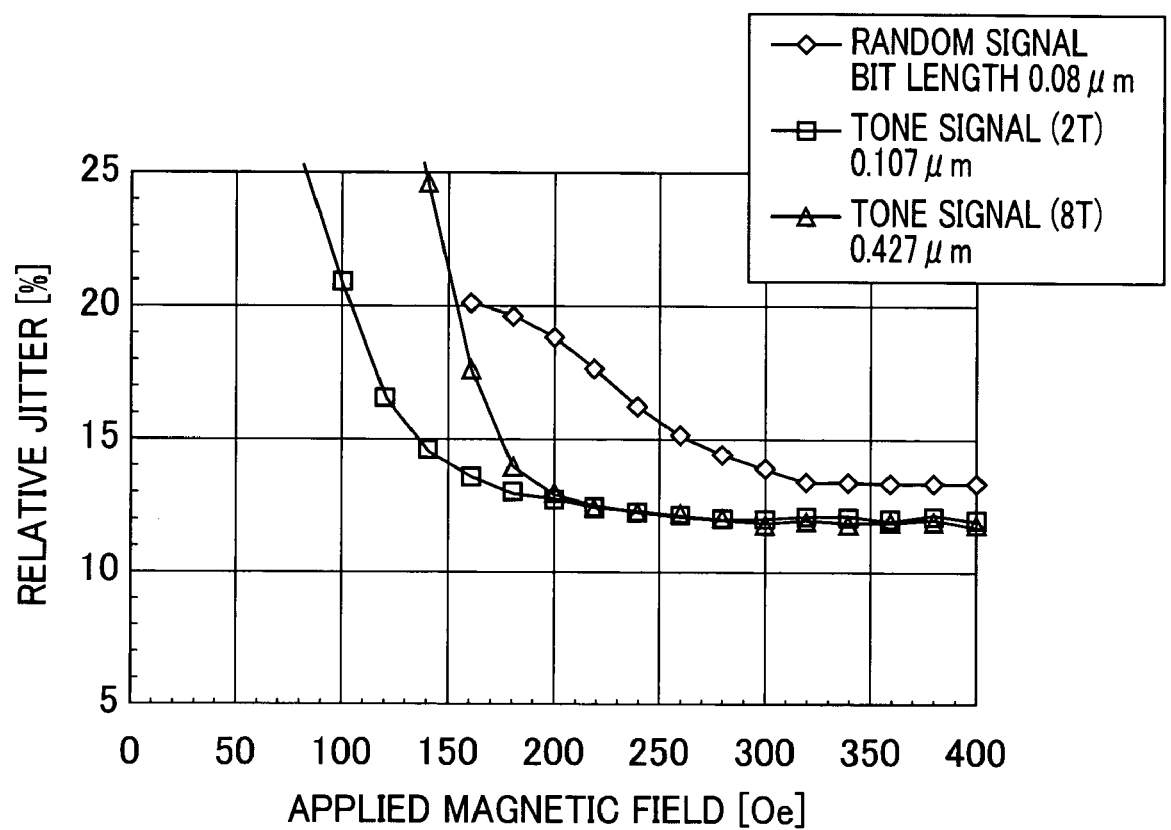
FIG. 6 is a graph showing the relationship between relative jitter and applied magnetic field at a groove of a magneto-optical recording medium according to Comparative Example 1.

A sample was prepared as in Example 1, but with no second auxiliary memory sublayer and in-plane magnetization-inducing layer. The dynamic characteristics were also evaluated, as in Example 1. FIGS. 5 and 6 show the results. On the groove, excellent jitter properties and a good sensitivity to a magnetic field were observed for the tone signal (2T) and the tone signal (8T), but for a random signal, the jitter properties were impaired by a pattern-dependent shift of a domain wall. Since the total thickness of layers deposited on the land was larger than that of layers deposited on the groove, the magnetic layers on the land were susceptible to the effect of the magnetization of the auxiliary memory layer. As a result, sensitivity to a magnetic field on a long mark (8T) deteriorated, and the jitter properties for a random signal were further impaired.

Example 2

A sample was prepared as in Example 1, but with a change in the Curie temperature of the second auxiliary memory sublayer. As a result, when the Curie temperature of the second auxiliary memory sublayer deviated from the range of 240° C. to a temperature of 40° C. lower than the Curie temperature of the memory layer (in this example, the range 240° C. to 290° C.), the jitter properties and/or sensitivity to a magnetic field deteriorated.

Example 3

A sample was prepared as in Example 1, but with a change in the thickness of the second auxiliary memory sublayer. As a result, when the thickness of the second auxiliary memory sublayer deviated from the range of 5 to 20 nm, the jitter properties and/or sensitivity to a magnetic field deteriorated.

Example 4

A sample was prepared as in Example 1, but with a change in the thickness of the in-plane magnetization-inducing layer. As a result, when the thickness of the in-plane magnetization-inducing layer deviated from the range of 3 to 15 nm, the jitter properties and/or sensitivity to a magnetic field deteriorated.

In the Examples and the Comparative Example, a non-annealed DWDD medium having a land/groove substrate with a deep groove is described above. However, the present invention can be applied to a DWDD medium that has no accumulation of domain wall energy at both sides of each recording track due to magnetic properties impaired by local-annealing of both sides of each recording track.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magneto-optical recording medium comprising:
a memory layer for recording information;
an auxiliary memory layer magnetically coupled to the memory layer and having weaker perpendicular magnetic anisotropy than that of the memory layer, the auxiliary memory layer comprising a first auxiliary memory layer and a second auxiliary memory sublayer having different Curie temperatures; and
an in-plane magnetization-inducing layer principally comprising cobalt, the in-plane magnetization-inducing layer causing in-plane magnetization orientation of the auxiliary memory layer by a magnetic exchange interaction, wherein the second auxiliary memory sublayer adjoins the in-plane magnetization-inducing layer and the first auxiliary memory sublayer adjoins the memory layer, the second auxiliary memory sublayer having a Curie temperature lower than that of the memory layer and the first auxiliary memory sublayer.

2. The magneto-optical recording medium according to claim 1, wherein the memory layer comprises an amorphous alloy comprising a rare-earth element and a transition element, wherein the rare-earth element is terbium or dysprosium.

3. The magneto-optical recording medium according to claim 1, wherein the second auxiliary memory sublayer has a Curie temperature of at least 240° C. and up to a temperature of 40° C. lower than the Curie temperature of the memory layer.

4. The magneto-optical recording medium according to claim 1, wherein the second auxiliary memory sublayer adjoins the in-plane magnetization-inducing layer and has a thickness of 5 to 20 nm.

5. The magneto-optical recording medium according to claim 1, wherein the in-plane magnetization-inducing layer has a thickness of 3 to 15 nm.

6. The magneto-optical recording medium according to claim 1, further comprising:
a displacement layer overlying the memory layer, the displacement layer having a smaller domain-wall coercive force than that of the memory layer; and
a switching layer provided between the displacement layer and the memory layer, the switching layer having a lower Curie temperature than that of the displacement layer and that of the memory layer.

* * * * *